United States Patent
Hsieh (10) Patent No.: US 10,668,815 B2
(45) Date of Patent: Jun. 2, 2020

(54) BRAKE ENERGY RECOVERY MODULE

(71) Applicant: NIKO SEMICONDUCTOR CO., LTD., New Taipei (TW)

(72) Inventor: Chih-Cheng Hsieh, Taoyuan (TW)

(73) Assignee: NIKO SEMICONDUCTOR CO., LTD., New Taipei (TW)

( * ) Notice: Subject to any disclaimer, the term of this patent is extended or adjusted under 35 U.S.C. 154(b) by 103 days.

(21) Appl. No.: 15/665,516

(22) Filed: Aug. 1, 2017

(65) Prior Publication Data

US 2018/0093573 A1 Apr. 5, 2018

(30) Foreign Application Priority Data

Sep. 30, 2016 (TW) .............................. 105131667 A (51) Int. Cl.
*B60L 7/26* (2006.01)
*B60L 7/16* (2006.01)
(Continued)

(52) U.S. Cl.
CPC .................. *B60L 7/26* (2013.01); *B60L 7/16* (2013.01); *B60L 15/2009* (2013.01); *B60L 15/2045* (2013.01); *B60W 20/14* (2016.01); *B60W 30/1819* (2013.01); *H02J 7/1415* (2013.01); *H02J 7/24* (2013.01); *B60L 2240/427* (2013.01); *B61D 43/00* (2013.01); *H02J 3/32* (2013.01); *H02J 7/2434* (2020.01); *Y02T 10/645* (2013.01); *Y02T 10/7005* (2013.01); *Y02T 10/7275* (2013.01)

(58) Field of Classification Search
CPC .......... B60L 7/26; B60L 7/16; B60L 15/2045; B61D 43/00; B60W 20/14; B60W 30/1819

USPC .......................................................... 318/376
See application file for complete search history.

(56) References Cited

U.S. PATENT DOCUMENTS 4,691,148 A * 9/1987 Nicholls ................. B60L 7/003 318/11
8,744,712 B2 6/2014 Tashiro
(Continued)

FOREIGN PATENT DOCUMENTS

| TW | I319932 | 1/2010 |
| TW | I418476 B | 12/2013 |
| WO | WO 2010/143280 A1 | 12/2012 |

*Primary Examiner* — Kawing Chan
*Assistant Examiner* — Bradley R Brown
(74) *Attorney, Agent, or Firm* — Li & Cai Intellectual Property (USA) Office (57) ABSTRACT

A brake energy recovery module for an electric vehicle. The electric vehicle includes a motor module and a battery module. The brake energy recovery module includes a first detecting unit, a signal decoder, a power converting unit and a control unit. The first detecting unit is electrically connected to the motor module to detect a first voltage of the motor module. The signal decoder generates a first signal and a second signal according to plural operation signals of the motor module. The power converting unit is electrically connected to the motor module and the battery module. The control unit is electrically connected to the first detecting unit, the signal decoder and the power converting unit. The control unit controls the power converting unit to adjust the first voltage to provide the battery module with a second voltage according to the first voltage, the first signal and the second signal.

10 Claims, 5 Drawing Sheets

(51) Int. Cl.
  *B60L 15/20*   (2006.01)
  *B60W 20/14*   (2016.01)
  *B60W 30/18*   (2012.01)
  *H02J 7/14*    (2006.01)
  *H02J 7/24*    (2006.01)
  *B61D 43/00*   (2006.01)
  *H02J 3/32*    (2006.01)

(56) References Cited

U.S. PATENT DOCUMENTS

| | | | |
|---|---|---|---|
| 2010/0006359 A1* | 1/2010 | Ang | B60K 6/445 |
| | | | 180/65.285 |
| 2012/0022735 A1* | 1/2012 | Tashiro | B60L 7/18 |
| | | | 701/22 |
| 2014/0200755 A1* | 7/2014 | Sisk | B60W 20/13 |
| | | | 701/22 |
| 2015/0134173 A1* | 5/2015 | Choi | B60W 20/00 |
| | | | 701/22 |
| 2015/0251648 A1* | 9/2015 | Okada | B60K 6/46 |
| | | | 701/22 |
| 2016/0114788 A1* | 4/2016 | Kamatani | B60K 6/445 |
| | | | 701/22 |
| 2017/0096135 A1* | 4/2017 | Kishimoto | B60L 50/51 |

* cited by examiner

BRAKE ENERGY RECOVERY MODULE

BACKGROUND

1. Technical Field

The present disclosure generally relates to a brake energy recovery module and, more particularly, to a brake energy recovery module for an electric vehicle.

2. Description of Related Art

In recent years, with the rise of environmental awareness, people from all over the world hope to rely less on fossil fuels and turn to more environmentally friendly energy resources. The electric vehicle is an emerging green industry, which has become a battlefield joined by major vehicle manufacturers. However, because of the use of a battery module, the electric vehicle has a problem of short endurance. Conventional electric vehicles, while cruising, use mechanical brakes to increase the friction of the wheels to achieve deceleration. This converts kinetic energy into thermal energy, which cannot be effectively recovered.

The power module currently used in an electric vehicle is mainly motor-based. There is plenty of energy recoverable when a motor is in the process of braking or gliding. Therefore, it has become one of the important issues in the industry to effectively recover the excess energy of a motor when an electric vehicle is in a non-cruising mode.

SUMMARY

In view of the above, the present disclosure provides a brake energy recovery module for an electric vehicle. The electric vehicle includes a motor module and a battery module. The brake energy recovery module includes a first detecting unit, a signal decoder, a power converting unit and a control unit. The first detecting unit is electrically connected to the motor module to detect a first voltage of the motor module. The signal decoder generates a first signal and a second signal according to a plurality of operation signals of the motor module. The power converting unit is electrically connected to the motor module and the battery module. The control unit is electrically connected to the first detecting unit, the signal decoder and the power converting unit. The control unit controls the power converting unit to adjust the first voltage to provide the battery module with a second voltage according to the first voltage, the first signal and the second signal.

To sum up, the brake energy recovery module of the present disclosure can detect the current status of an electric vehicle (such as cruising, gliding or braking), effectively convert the first voltage outputted by the motor module of the electric vehicle and favorably charge the battery according to the current status of the electric vehicle. Moreover, since the brake energy recovery module of the present disclosure is an independent module of the electric vehicle, the original settings do not need to be changed. Therefore, the brake energy recovery module is easy to install and is ready for mass production.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure.

While such terms as "first," "second," "third," etc., may be used to describe various components, such components must not be limited to the above terms. The above terms are used only to distinguish one component from another. For example, a second component may be referred to as a first component within the scope of the present disclosure, and similarly, the first component may be referred to as the second component. As used herein, the term "and/or" includes any and all combinations of one or more of the associated listed items.

The brake energy recovery module will be exemplified by at least one embodiment with reference to the figures herein. However, at least one embodiment is not intended to limit the scope of the present disclosure.

(Embodiment of Brake Energy Recovery Module)

Figure 1:
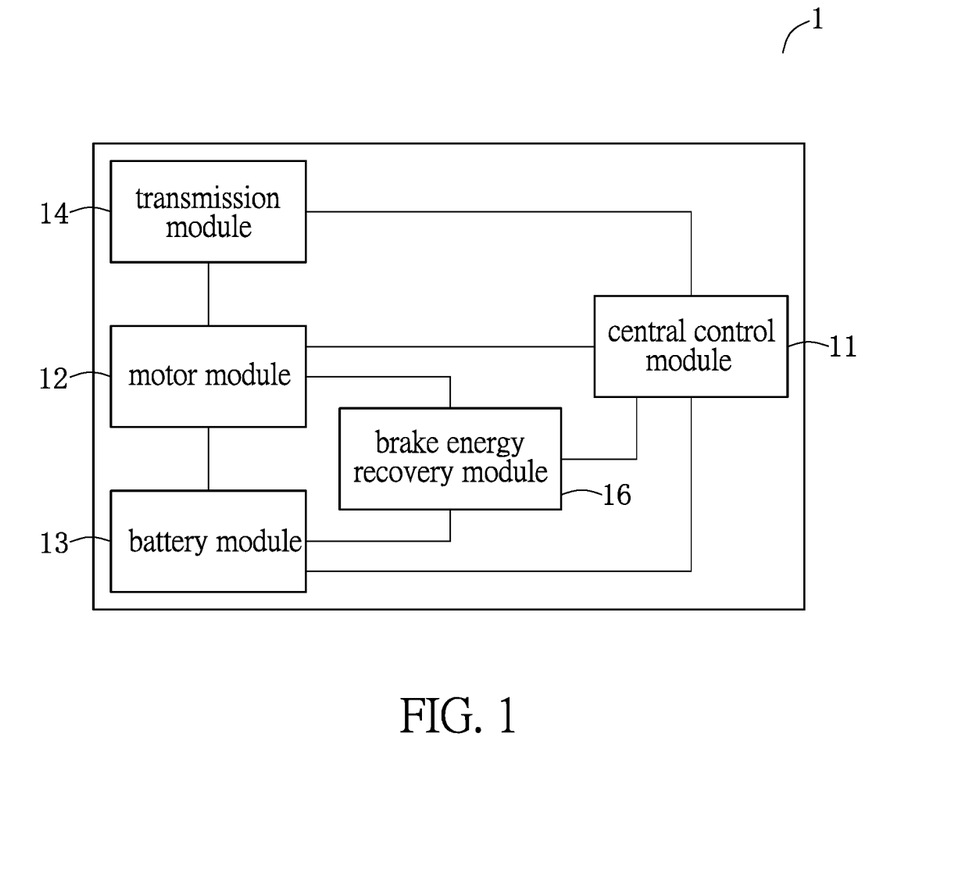
FIG. 1 is a schematic diagram of an electric vehicle according to one embodiment of the present disclosure.
Figure 2:
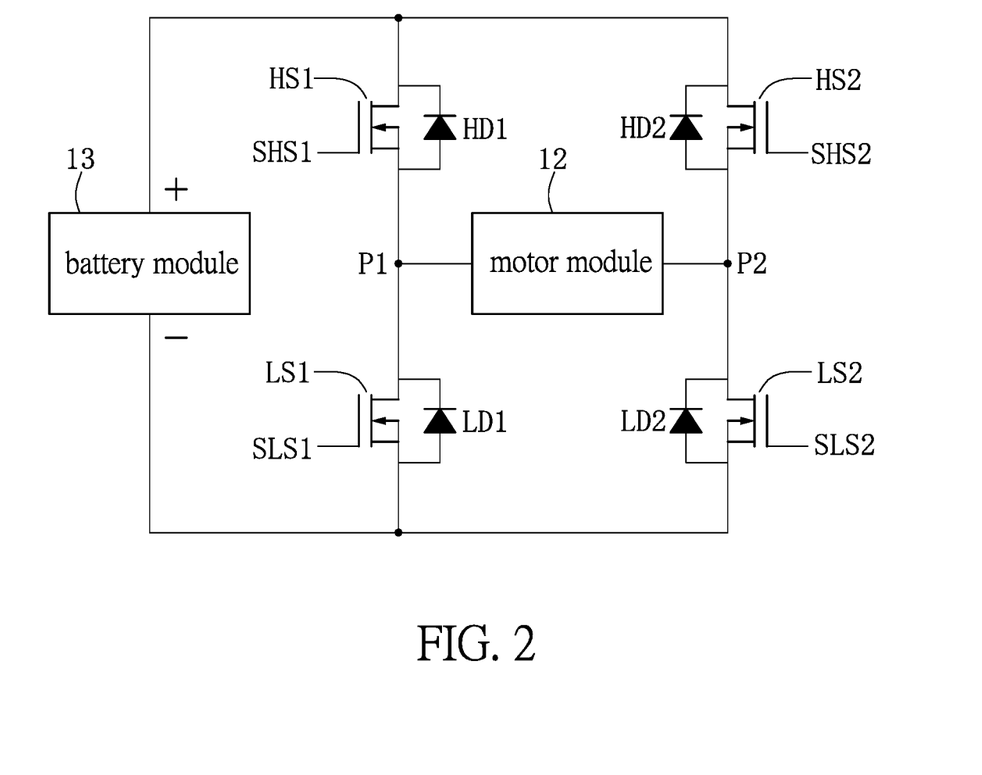
FIG. 2 is a schematic diagram of a motor controller in an electric vehicle in FIG. 1.
Figure 3:
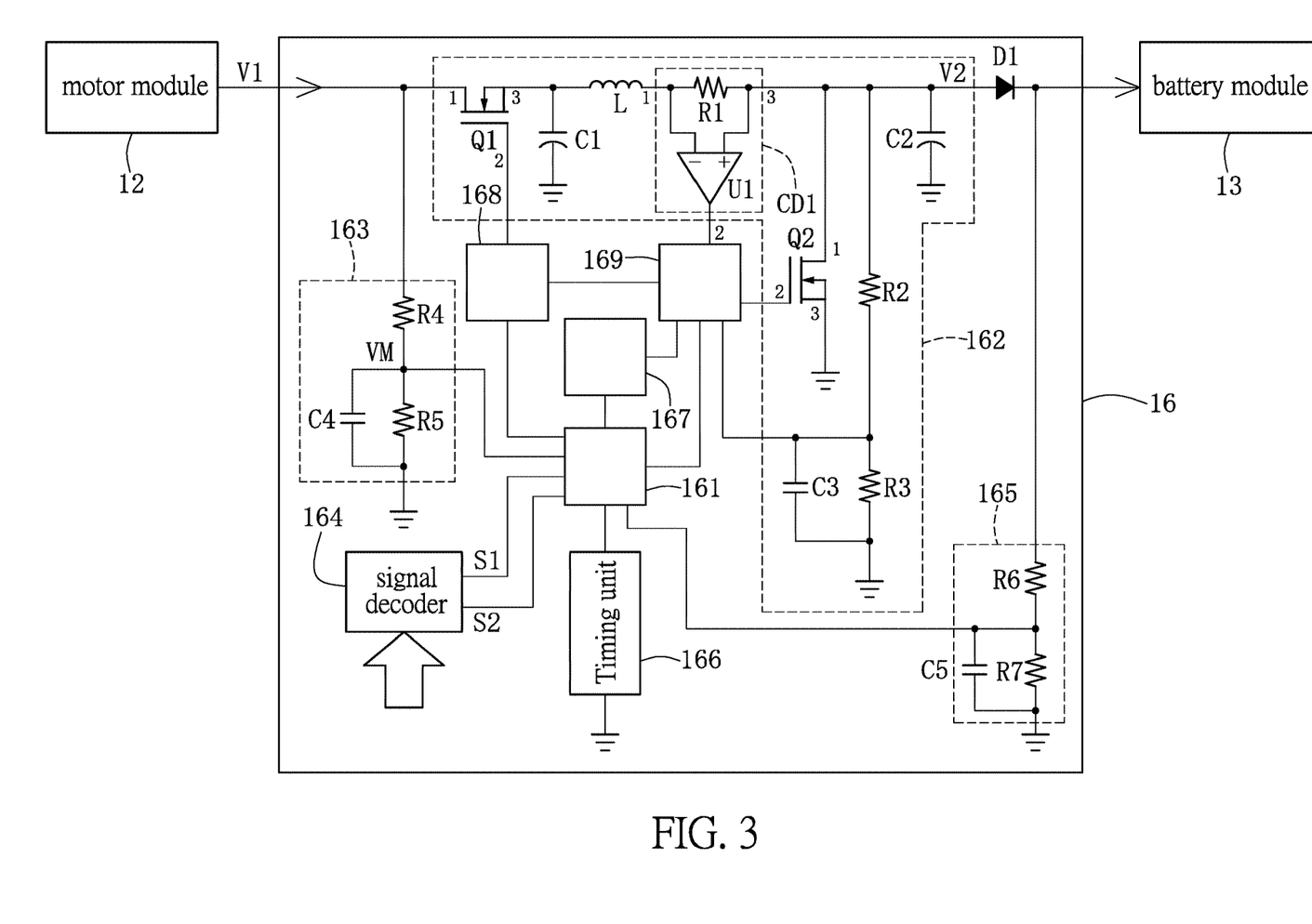
FIG. 3 is a schematic diagram of a brake energy recovery module according to one embodiment of the present disclosure.
Figure 4:
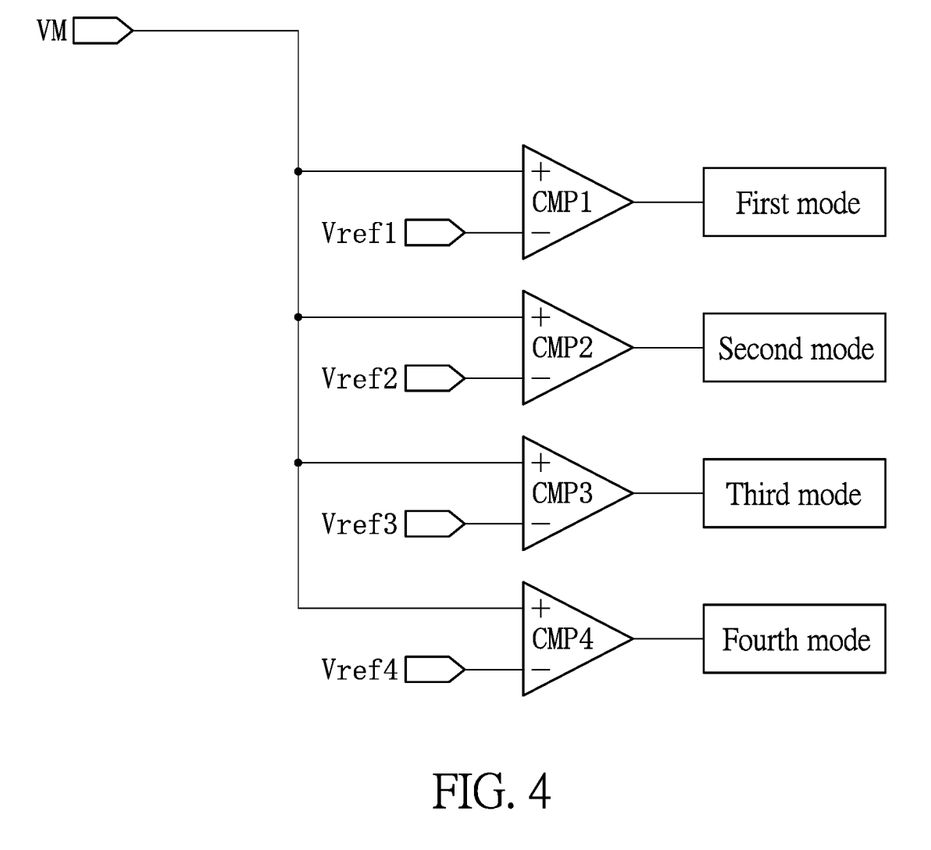
FIG. 4 is a schematic diagram showing the switching modes of a brake energy recovery module in FIG. 3.
Figure 5:
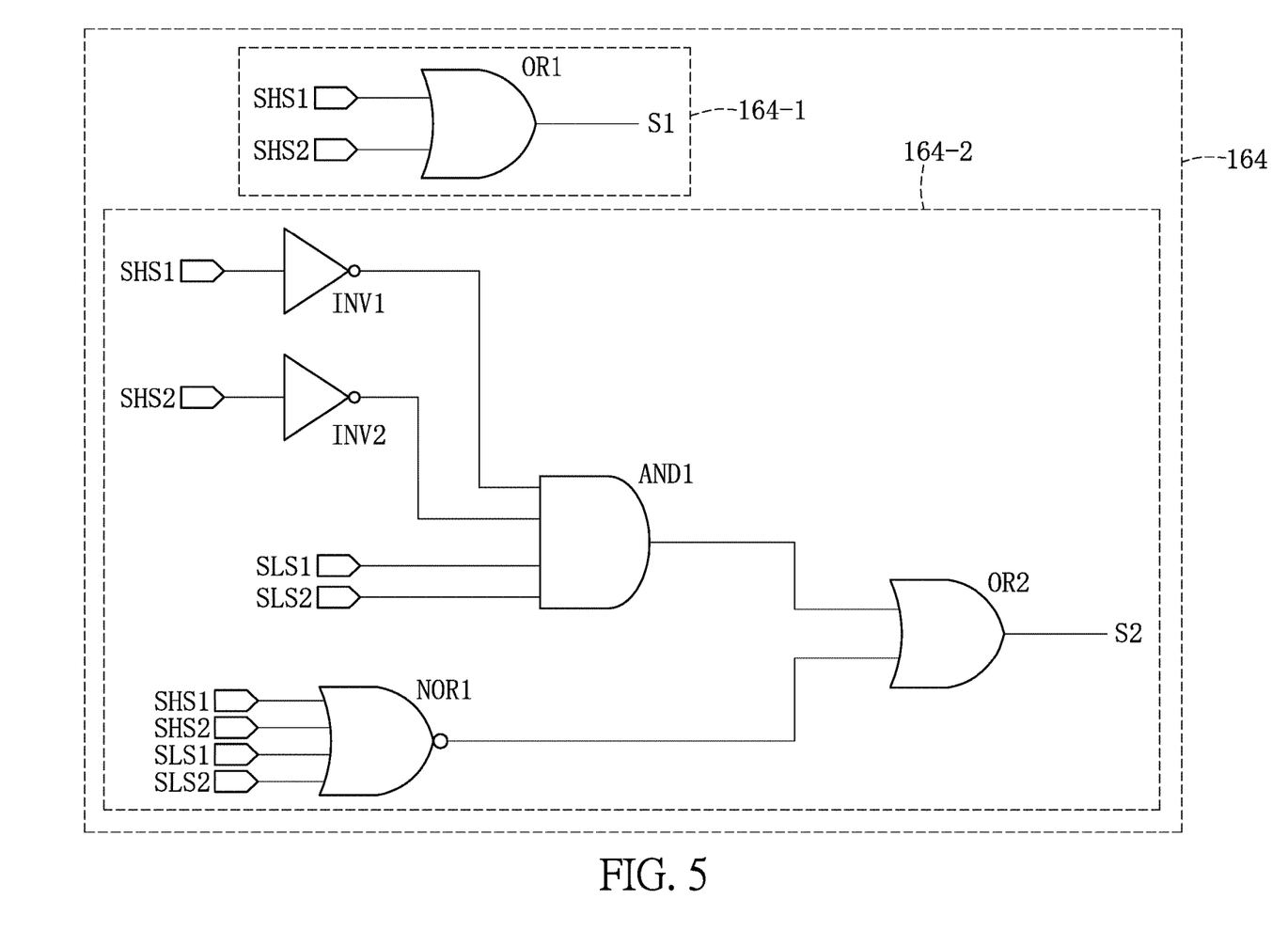
FIG. 5 is a schematic diagram of a signal decoder according to one embodiment of the present disclosure.

Referring to FIG. 1 to FIG. 4, FIG. 1 is a schematic diagram of an electric vehicle according to one embodiment of the present disclosure, FIG. 2 is a schematic diagram of a motor controller in an electric vehicle in FIG. 1, FIG. 3 is a schematic diagram of a brake energy recovery module according to one embodiment of the present disclosure, FIG. 4 is a schematic diagram showing the switching modes of a brake energy recovery module in FIG. 3 and FIG. 5 is a schematic diagram of a signal decoder according to one embodiment of the present disclosure.

An electric vehicle 1 includes a central control module 11, a motor module 12, a battery module 13, a transmission module 14 and a brake energy recovery module 16.

The battery module 13 provides the central control module 11, the motor module 12 and the brake energy recovery module 16 of the electric vehicle 1 with electric power to power up the electric vehicle 1. The motor module 12 is connected to the transmission module 14 to convert the electric power into mechanical energy to drive the electric vehicle 1.

In the central control module 11, a motor controller is used to control the motor module 12 and the battery module 13. The motor controller can be disposed inside or outside the central control module 11. A motor controller of a general electric vehicle 1 can be simplified as in FIG. 2.

The battery module 13 includes a battery and a super capacitor (not shown), and both of which can provide electric power. The super capacitor can supply a large current and a high voltage to a vehicle when the vehicle is just started. In the present embodiment, the battery is a rechargeable battery.

In one embodiment, a motor controller is described using control elements and control signals transmitted by the central control module 11. In FIG. 2, the motor controller is electrically connected to a first control terminal P1 and a second control terminal P2 of the motor module 12 through a first high-voltage side switching element HS1, a second high-voltage side switching element HS2, a first low-voltage side switching element LS1 and a second low-voltage side switching element LS2. Moreover, the motor controller provides the motor module 12 with electric power and controls the operation of the motor module 12 according to the states of the switching elements. In the present embodiment, the first high-voltage side switching element HS1, the second high-voltage side switching element HS2, the first low-voltage side switching element LS1 and the second low-voltage side switching element LS2 can be implemented by metal-oxide-semiconductor field-effect transistors (MOSFETs), bipolar junction transistors (BJTs) or insulated-gate bipolar transistors (IGBTs).

In the present embodiment, the brake energy recovery module 16 can be disposed on both terminals of the first high-voltage side switching element HS1, both terminals of the second high-voltage side switching element HS2, both terminals of the first low-voltage side switching element LS1 or both terminals of the second low-voltage side switching element LS2.

In the present embodiment, the first high-voltage side switching element HS1 and the second low-voltage side switching element LS2 together can control the motor to rotate forwards. The second high-voltage side switching element HS2 and the first low-voltage side switching element LS1 together can control the motor to rotate backwards. In the present embodiment, the first high-voltage side switching element HS1, the second high-voltage side switching element HS2, the first low-voltage side switching element LS1 and the second low-voltage side switching element LS2 are implemented by a body diode HD1, a body diode HD2, a body diode LD1 and a body diode LD2, respectively.

Referring to FIG. 3, the brake energy recovery module 16 is connected between the motor module 12 and the battery module 13. When the electric vehicle 1 is braking or gliding, the energy generated from the motor module 12 (meanwhile, the motor can be regarded as a power generator) is stored in the battery module 13.

Referring to FIG. 3, the brake energy recovery module 16 includes a control unit 161, a power converting unit 162, a first detecting unit 163, a signal decoder 164, a second detecting unit 165, a timer unit 166, a PWM (pulse-width modulation) signal generating unit 167, a gate driver 168, a buck/boost adjusting unit 169, and a protection unit D1.

The first detecting unit 163 is electrically connected to the motor module 12 to detect a first voltage V1 of the motor module 12. The first voltage V1 refers to a back electromotive force (emf) of the motor module 12 when the electric vehicle 1 is braking or gliding. The signal decoder 164 acquires operation signals from the motor module 12 according to a plurality of operation signals of the motor module 12 transmitted by the central control module 11. For example, in FIG. 2, the signal decoder 164 acquires a first high-voltage side signal SHS1, a second high-voltage side signal SHS2, a first low-voltage side signal SLS1 and a second low-voltage side signal SLS2 to generate a first signal S1 and a second signal S2.

The second detecting unit 165 is configured to detect the load of the battery module 13. If the battery module 13 is fully loaded or its battery voltage reaches an upper limit value, the second detecting unit 165 transmits a detected signal to the control unit 161, such that the brake energy recovery module 16 stops converting the first voltage into the second voltage, so as to prevent the battery module 13 from being overcharged to cause damage.

The power converting unit 162 uses the gate driver 168 and the buck/boost adjusting unit 169 controlled by the control unit 161 to adjust the first voltage V1 of the motor module 12 to provide a second voltage V2. The second voltage V2 is provided to charge the battery module 13. The timer unit 166 provides the control unit 161 with a timer signal, such that the control unit 161 operates after the control unit 161 confirms that the first signal S1 or the second signal S2 has sustained over a fixed time. For example, the timer signal uses a clock signal and a time delay signal externally adjustable to determine a fixed delay time. The protection unit D1 is disposed between the power converting unit 162 and the battery module 13 to prevent the generation of a reverse current that may cause damage. In the present embodiment, the protection unit D1 is a diode. In other embodiments, the protection unit D1 can be implemented by other elements such as a MOSFET, to which the present disclosure is not limited.

The control unit 161 is electrically connected to the power converting unit 162, the first detecting unit 163, the signal decoder 164, the second detecting unit 165 and the timer unit 166. In other words, the control unit 161 uses the buck/boost adjusting unit 169 and the gate driver 168 to output the control signal to the power converting unit 162, and receives, directly or indirectly, the signals detected by the first detecting unit 163, the signal decoder 164 and the second detecting unit 165. For example, the signals include the first voltage V1 of the motor module 12 detected by the first detecting unit 163, the first signal S1 and the second signal S2 generated by the signal decoder 164 according to a plurality of operation signals of the motor module 12, the second voltage V2 detected by the second detecting unit 165, etc. In the present embodiment, the buck/boost adjusting unit 169 is electrically connected to a first terminal of the current detecting unit CD1, a second terminal of a second power element Q2 and a first terminal of a third capacitor C3. The buck/boost adjusting unit 169 is electrically connected to the control unit 161 and the PWM signal generating unit 167 to receive the control signals from the control unit 161 and the PWM signal generating unit 167, respectively.

The control unit 161 is electrically connected to the PWM signal generating unit 167, the gate driver 168, and the buck/boost adjusting unit 169. Moreover, the buck/boost adjusting unit 169 is electrically connected to the gate driver 168. The gate driver 168 is electrically connected to a second terminal of a first power element Q1 to provide the first power element Q1 with a control signal.

The PWM signal generating unit 167 is configured to generate a PWM signal and is connected to the control unit 161 and the buck/boost adjusting unit 169. The gate driver 168 drives the first power element Q1 according to a control signal of the control unit 161 or the buck/boost adjusting unit 169. The buck/boost adjusting unit 169 controls the operation status of the buck/boost adjusting unit 169, such that the power converting unit 162 operates in a buck mode, a boost mode, a constant-current mode or a constant-voltage mode according to the back electromotive force of the motor and the operation status and a feedback signal of voltage and current of the battery module 13.

The control unit 161 adjusts the first voltage V1 of the motor module 12 according to the first voltage V1 of the motor module 12, the first signal S1 and the second signal S2 from the signal decoder 164, a timer signal TS of the timer unit 166, and the control power converting unit 162. In other words, the first voltage V1 of the motor module 12 is adjusted and is converted into the second voltage V2 by the power converting unit 162 for charging the battery module 13. Furthermore, the control unit 161 operates after the control unit 161 confirms that the first signal S1 or the second signal S2 has sustained over the fixed time according to the timer signal TS of the timer unit 166 so as to prevent the battery module 13 from being overcharged. Consequently, the lifetime of the battery module 13 is not affected by driving habits (for example, frequently stepping on the brake or the accelerator all at once) of the driver of the electric vehicle 1.

In the present embodiment, when the electric vehicle brakes emergently at a high speed, the motor module 12 generates a transient voltage surge and the control unit 161 immediately activates the first power element Q1, such that the first capacitor C1 absorbs energy of the transient voltage surge. Moreover, after a pre-determined delay time provided by the timer unit 166, the first voltage V1 stabilizes and the control unit 161 controls the power converting unit 162 to activate the second power element Q2 to release the energy of the transient voltage surge absorbed by the first capacitor C1 to prevent the battery module 13 from being damaged by the high voltage or large current and prevent the brake energy recovery module 16 from electromagnetic interference (EMI). In the present embodiment, for better understanding, the devices with two terminals in FIG. 3 are defined to have a first terminal on the left and a second terminal on the left if being disposed horizontally and a first terminal on the top and a second terminal at the bottom if being disposed vertically. The devices with three terminals in FIG. 3 are defined according to the numbers indicating the terminals.

The power converting unit 162 includes a first power element Q1, a second power element Q2, a first capacitor C1, a second capacitor C2, a current detection element CD1 and a first inductor L1. A first terminal of the first power element Q1 is electrically connected to the motor module 12 and the first detecting unit 163.

In the present embodiment, the first detecting unit 163 includes a fourth resistor R4, a fifth resistor R5 and a fourth capacitor C4. A first terminal of the fourth resistor R4 is connected to the first terminal of the first power element. A second terminal of the fourth resistor R4 is connected to the control unit 161 and a first terminal of the fifth resistor R5. A second terminal of the fifth resistor R5 is connected to a grounding terminal. A first terminal and a second terminal of the fourth capacitor C4 are connected to the first terminal and the second terminal of the fifth resistor R5, respectively. In other words, the fourth capacitor C4 and the fifth resistor R5 are connected in parallel. The first detecting unit 163 is configured to detect the first voltage V1.

The second terminal of the first power element Q1 is electrically connected to the gate driver 168. A third terminal of the first power element Q1 is electrically connected to a first terminal of the first capacitor C1 and a first terminal of the first inductor L1. A second terminal of the first capacitor C1 is electrically connected to a grounding terminal. A second terminal of the first inductor L1 is electrically connected to the first terminal of the current detecting unit CD1. A second terminal of the current detecting unit CD1 is electrically connected to the control unit 161. A third terminal of the current detecting unit CD1 is electrically connected to a first terminal of the second power element Q2, a first terminal of the second capacitor C2, and a first terminal of the protection unit D1. A second terminal of the second power element Q2 is electrically connected to the control unit 161. In the present embodiment, a third terminal of the second power element Q2 is electrically connected to the grounding terminal. Moreover, the current detecting unit CD1 includes a first resistor R1 and an amplifier U1 to detect the current flowing through the power converting unit 162 to provide current feedback control and over-current protection. Moreover, the power converting unit 162 further includes a second resistor R2, a third resistor R3 and a third capacitor C3 to detect the second voltage V2 to provide voltage feedback control and over-voltage protection. In the present embodiment, the first power element Q1 and the second power element Q2 can be implemented by metal-oxide-semiconductor field-effect transistors (MOSFETs), bipolar junction transistors (BJTs) or insulated-gate bipolar transistors (IGBTs), to which the present disclosure is not limited. In the present embodiment, the first capacitor C1 is in charge of absorbing the voltage surge generated during an emergency brake and is required to store a large amount of energy and filter out undesired voltage ripples. Therefore, the first capacitor C1 is preferably to have high capacitance, which is determined according to the actual circuit design and the cost limit.

The signal decoder 164 generates a first signal S1 and a second signal S2 according to a plurality of operation signals of the motor module 12 to control the control unit 161. In the present embodiment, the first signal S1 is a throttle signal and the second signal S2 is a brake signal. When the first signal S1 is ON, in other words, the user steps on the gas pedal, the central control module 11 receives a throttle signal that is ON and transmits a control signal to the motor module 12. In the present embodiment, when the throttle signal is ON, the central control module 11 detects that the user has stepped on the gas pedal. When the throttle signal is OFF, the central control module 11 does not detect that the user has stepped on the gas pedal.

Referring to FIG. 5, FIG. 5 is a schematic diagram of a signal decoder according to one embodiment of the present disclosure. The signal decoder 164 includes two circuits, namely, a first signal decision circuit 164-1 and a second signal decision circuit 164-2.

The first signal decision circuit 164-1 includes a first OR gate OR1. Two input terminals of the first OR gate OR1 receive a first high-voltage side signal SHS1 and a second high-voltage side signal SHS2, respectively. In other words, the first signal S1 (i.e., the throttle signal) corresponds to the first high-voltage side signal SHS1 and the second high-voltage side signal SHS2.

The second signal decision circuit 164-2 includes a first inverter INV1, a second inverter INV2, a first AND gate AND1, a second OR gate OR2 and a first NOR gate NOR1. An input terminal of the first inverter INV1 receives the first high-voltage side signal SHS1, and an input terminal of the second inverter INV2 receives the second high-voltage side signal SHS2. An output terminal of the first inverter INV1, an output terminal of the second inverter INV2, a first low-voltage side signal SLS1 and a second low-voltage side signal SLS2 are connected to input terminals of the first AND gate AND1. An input terminal of the first NOR gate NOR1 receives the first high-voltage side signal SHS1, the second high-voltage side signal SHS2, the first low-voltage side signal SLS1 and the second low-voltage side signal SLS2. An output terminal of the first NOR gate NOR1 and an output terminal of the first AND gate AND1 are connected to two input terminals of the second OR gate, respectively.

An output signal of the first AND gate AND1 is for deciding whether the electric vehicle 1 is in the dynamic braking. An output signal of the first NOR gate NOR1 is for determining whether the electric vehicle 1 is gliding. An output signal of the second OR gate OR2 is the second signal S2, i.e., the brake signal, for determining whether the user has stepped on the brake. In the present embodiment, the second detecting unit 165 is connected to the battery module 13 and the control unit 161. The second detecting unit 165 includes a sixth resistor R6, a seventh resistor R7 and a fifth capacitor C5. A first terminal of the sixth resistor R6 is connected to the battery module 13, and a second terminal of the sixth resistor R6 is connected to the control unit 161 and a first terminal of the seventh resistor R7. A second terminal of the seventh resistor R7 is connected to the grounding terminal. A first terminal and a second terminal of the fifth capacitor C5 are connected to the first terminal and the second terminal of the seventh resistor R7, respectively. In other words, the fifth capacitor C5 and the seventh resistor R7 are connected in parallel. In the present embodiment, the brake energy recovery module 16 charges the battery module 13 with the second voltage V2. The second detecting unit 165 detects the current battery voltage of the battery module 13 to provide the control unit 161 with a feedback signal. The control unit 161 controls the power converting unit 162 to operate in an optimal mode according to the feedback signal provided by the second detecting unit 165.

As shown in FIG. 2, the control signal of the motor module 12, in the present embodiment, at least includes a first high-voltage side signal SHS1, a second high-voltage side signal SHS2, a first low-voltage side signal SLS1 and a second low-voltage side signal SLS2. In other embodiments, the control signal may include more signals such as the control signal for a three-phase motor including, for example, 6 signals.

In the present embodiment, the first high-voltage side signal SHS1, the second high-voltage side signal SHS2, the first low-voltage side signal SLS1 and the second low-voltage side signal SLS2 are used for controlling the control motor module 12 to rotate forwards, backwards, or operate in other modes. The first high-voltage side signal SHS1, the second high-voltage side signal SHS2, the first low-voltage side signal SLS1 and the second low-voltage side signal SLS2 may be ON signals, OFF signals or pulse-width modulation (PWM) signals. For example, when the electric vehicle 1 is moving forwards, the first high-voltage side signal SHS1 is ON, the second high-voltage side signal SHS2 is OFF, the first low-voltage side signal SLS1 is OFF, and the second low-voltage side signal SLS2 is a PWM signal so as to correspondingly control the first high-voltage side switching element HS1, the second high-voltage side switching element HS2, the first low-voltage side switching element LS1 and the second low-voltage side switching element LS2 to control the electric vehicle 1 to move forwards with an adjustable speed.

The relation between the operation modes of the electric vehicle 1 and the operation modes of the brake energy recovery module according to the present disclosure is summarized in Table 1.

| Operation modes of electric vehicle | S1 | S2 | First voltage (V1) | Delayed start | Operation modes of brake energy recovery module |
| --- | --- | --- | --- | --- | --- |
| Forwards | ON | OFF | Higher than first reference voltage | OFF | Activating device and operation mode unchanged |
| Backwards | ON | OFF | Higher than first reference voltage | OFF | Activating device and operation mode unchanged |
| Forwards | ON | OFF | Lower than first reference voltage | ON | Into sleep mode |
| Backwards | OFF | OFF | Lower than first reference voltage | ON | Into sleep mode |
| Gliding | OFF | OFF | Lower than first reference voltage | NO | Into sleep mode |
| Gliding | OFF | OFF | Higher than first reference voltage and lower than second reference voltage | ON | Charging in boost mode |
| Gliding | OFF | OFF | Higher than second reference voltage and lower than third reference voltage | ON | Charging in buck mode |
| Gliding | OFF | OFF | Higher than third reference voltage | OFF | Absorbing surge energy fast |
| Braking | OFF | ON | Lower than first reference voltage | ON | Inactive |
| Braking | OFF | ON | Higher than first reference voltage and lower than second reference voltage | NO | Charging in boost mode |

-continued

| Operation modes of electric vehicle | S1 | S2 | First voltage (V1) | Delayed start | Operation modes of brake energy recovery module |
|---|---|---|---|---|---|
| Braking | OFF | ON | Higher than second reference voltage and lower than third reference voltage | ON | Charging in buck mode |
| Braking | OFF | ON | Higher than third reference voltage | OFF | Absorbing surge energy fast |

Table 1: the operation modes of the electric vehicle 1 vs. the operation modes of the brake energy recovery module.

For example, when the electric vehicle 1 is gliding, the first high-voltage side signal SHS1, the second high-voltage side signal SHS2, the first low-voltage side signal SLS1 and the second low-voltage side signal SLS2 are all OFF, such that the first high-voltage side switching element HS1, the second high-voltage side switching element HS2, the first low-voltage side switching element LS1 and the second low-voltage side switching element LS2 are all turned off. Meanwhile, the motor module 12 functions like a power generator and the power generated by the motor module 12 charges the battery module 13. In the present embodiment, when the electric vehicle 1 is braking, the first high-voltage side signal SHS1 and the second high-voltage side signal SHS2 are all OFF so as to control the first high-voltage side switching element HS1 and the second high-voltage side switching element HS2 to be turned off. The first low-voltage side signal SLS1 and the second low-voltage side signal SLS2 are PWM signals. Meanwhile, the energy of the motor module 12 is recoverable.

Referring to FIG. 3, in the present embodiment, the signal decoder 164 generates a first signal S1 (i.e., the throttle signal) and a second signal S2 (i.e., the brake signal), based on which the brake energy recovery module 16 operates, according to a plurality of operation signals of the motor module 12 (for example, the first high-voltage side switching element HS1, the second high-voltage side switching element HS2, the first low-voltage side signal SLS1 and the second low-voltage side signal SLS2 in FIG. 2). When the signal decoder 164 detects that the first signal S1 (i.e., the throttle signal) is ON, in other words, the electric vehicle 1 is moving forwards or backwards, the brake energy recovery module 16 is inactive. When the signal decoder 164 detects that the second signal S2 (i.e., the brake signal) is ON, the brake energy recovery module 16 functions differently according to the first voltage V1 outputted by the motor module 12. Moreover, when the signal decoder 164 receives none of the first signal S1 (i.e., the throttle signal) and the second signal S2 (i.e., the brake signal), it indicates that the electric vehicle 1 is gliding, and the brake energy recovery module 16 functions differently according to the first voltage V1 outputted by the motor module 12.

The relation between the operation modes of the electric vehicle 1 and the driving signals of the motor according to the present disclosure is summarized in Table 2, where ON indicates an on signal, OFF indicates an off signal, PWM indicates a PWM signal, SHS1, SHS2, SLS1, and SLS2 indicate a first high-voltage side signal SHS1, a second high-voltage side signal SHS2, a first low-voltage side signal SLS1 and a second low-voltage side signal SLS2, respectively.

| Operation modes of electric vehicle | SHS1 | SLS1 | SHS2 | SLS2 |
|---|---|---|---|---|
| Forwards | ON | OFF | OFF | PWM |
| Gliding | OFF | OFF | OFF | OFF |
| Dynamic braking | OFF | PWM | OFF | PWM |
| Reverse braking | OFF | PWM | ON | OFF |
| Backwards | OFF | PWM | ON | OFF |
| Backward dynamic braking | OFF | PWM | OFF | PWM |
| Backward reverse braking | ON | OFF | OFF | PWM |

Table 2: the operation modes of the electric vehicle vs. the driving signals of the motor.

Since the motor module 12 outputs different first voltages V1 under different operation conditions, the brake energy recovery module 16 provides 4 operation modes corresponding to various first voltages V1 outputted by the motor module 12.

Referring to FIG. 3 and FIG. 4, the first detecting unit 163 uses a voltage divider circuit to step down the first voltage V1 to the converted voltage VM, such that the brake energy recovery module 16 uses a first comparator CMP1 to compare the converted voltage VM with a first reference voltage Vref1. When the speed of the electric vehicle 1 is lower than a first speed limit (for example, 3 km/h), i.e., the converted voltage VM is lower than the first reference voltage Vref1, the control unit 161 of the brake energy recovery module 16 controls most of the components to enter a sleep mode to reduce power consumption because the first voltage V1 is too low to be stepped up or results in poor conversion efficiency. Moreover, the brake energy recovery module 16 uses a second comparator CMP2 to compare the converted voltage VM with a second reference voltage Vref2. When the speed of the electric vehicle 1 is higher than the first speed limit and is lower than a second speed limit, i.e., the converted voltage VM of the motor module 12 is higher than the first reference voltage Vref1 and is lower than the second reference voltage Vref2, the brake energy recovery module 16 enters a second mode. The control unit 161 of the brake energy recovery module 16 adjusts the power converting unit 162 to enter a boost mode to step up the first voltage V1 and charge the battery module 13. In other words, the first power element Q1 of the power converting unit 162 stays on and the second power element Q2 is controlled by a PWM signal, such that the power converting unit 162 functions as a boost converter to step up the first voltage V1.

When the speed of the electric vehicle 1 is higher than the second speed limit, the brake energy recovery module 16 uses a third comparator CMP3 to compare the converted voltage VM with a third reference voltage Vref3, the converted voltage VM of the motor module 12 is higher than the second reference voltage Vref2 and lower than the third reference voltage Vref3, the brake energy recovery module 16 enters a third mode. The control unit 161 of the brake energy recovery module 16 adjusts the power converting unit 162 to enter a buck mode to step down the first voltage V1 and charge the battery module 13. In other words, the first power element Q1 of the power converting unit 162 is controlled by a PWM signal and the second power element Q2 stays off, such that the power converting unit 162 functions as a buck converter to step down the first voltage V1.

When the electric vehicle 1 brakes emergently at a high speed and the converted voltage VM of the motor module 12 is higher than a fourth reference voltage Vref4, the control unit 161 transmits an ON signal to the first power element Q1 of the gate driver 168, such that the first capacitor C1 absorbs the large amount of energy from the transient voltage surge generated during the emergency brake of the motor module 12. As the first detecting unit 163 detects that the converted voltage VM of the motor module 12 is lower than the fourth reference voltage Vref4, the control unit 161 adjusts the power converting unit 162 to enter a buck mode to charge the battery module 13. The first voltage V1 corresponding to the fourth reference voltage Vref4 is determined to be 80% of the breakdown voltage of power devices used by the motor controller of an electric vehicle.

Moreover, when the battery is fully charged or its battery voltage reaches an upper limit value (which can be adjusted according to actual demands), the first power element Q1 is off and stops the generation of power so as to prevent the battery from being overcharged to cause damage. However, when the electric vehicle 1 brakes emergently at a high speed, the back electromotive force (emf) is very high, such that the converted voltage VM is higher than the fourth reference voltage. In order to prevent the power devices from being damaged, the first power element Q1 has to be turned on immediately such that the first capacitor C1 absorbs the energy of the transient voltage surge. Moreover, after a certain period of time, the second power element Q2 is controlled to be turned on and connected to the grounding terminal, such that the first capacitor C1 releases the energy of the transient voltage surge. The discharge current through the second power element Q2 can be determined by the control unit 161 and controlled by the current detecting unit CD1 through a feedback loop. When the throttle signal is ON, the first power element Q1 is turned off and the first capacitor C1 continues to discharge through the second power element Q2 until the voltage across the first capacitor C1 drops to a low value. Therefore, the voltage surge is suppressed and the system returns to be monitored.

In the present embodiment, the second detecting unit 165 is configured to detect the statuses of the battery module 13 such as the load, the voltage, etc. Therefore, the control unit 161 can further provide various charging modes suitable for the battery module 13, for example, the constant-current mode or the constant-voltage mode, to which the present disclosure is not limited, according to the status of the battery module 13 detected by the second detecting unit 165.

(Function of Embodiments)

To sum up, the brake energy recovery module of the present disclosure can detect the current status of an electric vehicle (such as cruising, gliding or braking), effectively convert the first voltage outputted by the motor module of the electric vehicle and favorably charge the battery according to the current status of the electric vehicle. Moreover, since the brake energy recovery module of the present disclosure is an independent module of the electric vehicle, the original settings do not need to be changed. Therefore, the brake energy recovery module is easy to install and is ready for mass production.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. A brake energy recovery module for an electric vehicle, said electric vehicle comprising a motor module and a battery module, said brake energy recovery module comprising:

a first detecting unit electrically connected to said motor module to detect a first voltage of said motor module;

a signal decoder configured to generate a first signal and a second signal according to a plurality of operation signals of said motor module;

a power converting unit electrically connected to said motor module and said battery module; and a control unit electrically connected to said first detecting unit, said signal decoder and said power converting unit;

wherein said control unit controls said power converting unit to adjust said first voltage to provide said battery module with a second voltage according to said first voltage, said first signal and said second signal;

wherein said first detecting unit steps down said first voltage into a converted voltage, such that said control unit inactivates said power converting unit to be in a sleep mode when said converted voltage is lower than a first reference voltage.

2. The brake energy recovery module of claim 1, further comprising:

a protection unit electrically connected between said power converting unit and said battery module.

3. The brake energy recovery module of claim 1, wherein said first signal and said second signal refer to a throttle signal and a brake signal, respectively, and said power converting unit is inactive when said throttle signal is activated.

4. The brake energy recovery module of claim 3, further comprising a timer unit configured to provide said control unit with a fixed time, such that said control unit operates after said control unit confirms that said first signal or said second signal has sustained over said fixed time.

5. The brake energy recovery module of claim 1, wherein said control unit controls said power converting unit to operate in a boost mode when said converted voltage is high than said first reference voltage and lower than a second reference voltage, said control unit controls said power converting unit to operate in a buck mode when said converted voltage is higher than said second reference voltage and lower than a third reference voltage, and said control unit activates a first power element of said power converting unit such that a first capacitor of said power converting unit absorbs a transient voltage surge when said converted voltage is higher than a fourth reference voltage, wherein said fourth reference voltage is higher than said third reference voltage, said third reference voltage is higher than said second reference voltage, and said second reference voltage is higher than said first reference voltage.

6. The brake energy recovery module of claim 1, further comprising:

a PWM (pulse-width modulation) signal generating unit configured to generate a PWM signal, wherein said PWM signal generating unit is electrically connected to said control unit;

a gate driver electrically connected to said control unit and said power converting unit to drive said power converting unit; and a buck/boost adjusting unit connected to said power converting unit, said control unit, said gate driver and said PWM signal generating unit, and configured to adjust said power converting unit to operate in a buck mode, a boost mode, a constant-current mode or a constant-voltage mode.

7. The brake energy recovery module of claim 1, wherein said first detecting unit comprises a fourth resistor, a fifth resistor and a fourth capacitor, wherein a first terminal of said fourth resistor is connected to said power converting unit, a second terminal of said fourth resistor is connected to said control unit and a first terminal of said fifth resistor, a second terminal of said fifth resistor is connected to a grounding terminal, and said fourth capacitor is connected in parallel with said fifth resistor.

8. The brake energy recovery module of claim 1, wherein said signal decoder comprising:
   a first signal decision circuit, comprising:
      a first OR gate comprising two input terminals receiving a first high-voltage side signal and a second high-voltage side signal, respectively; and
   a second signal decision circuit, comprising:
      a first inverter comprising an input terminal receiving said first high-voltage side signal;
      a second inverter comprising an input terminal receiving said second high-voltage side signal;
      a first AND gate comprising input terminals receiving an output terminal of said first inverter, an output terminal of said second inverter, a first low-voltage side signal and a second low-voltage side signal, respectively;
      a second OR gate; and
      a first NOR gate;
   wherein an input terminal of said first NOR gate receives said first high-voltage side signal, said second high-voltage side signal, said first low-voltage side signal and said second low-voltage side signal, respectively, and an output terminal of said first NOR gate and an output terminal of said first AND gate are connected to two input terminals of said second OR gate, respectively; and
   wherein an output terminal of said first OR gate outputs said first signal, and an output terminal of said second OR gate outputs said second signal.

9. The brake energy recovery module of claim 1, further comprising a second detecting unit connected to said battery module and said control unit to transmit a detected signal to said control unit such that said control unit stops converting said first voltage into said second voltage when said second detecting unit detects that said battery module is fully loaded or that a battery voltage reaches an upper limit value.

10. The brake energy recovery module of claim 1, wherein, when said electric vehicle brakes emergently at a high speed, said motor module generates a transient voltage surge and, when said transient voltage surge is higher than a fourth reference voltage, said control unit immediately activates a first power element of said power converting unit, such that a first capacitor of said power converting unit absorbs an energy of said transient voltage surge and, after a pre-determined delay time, said control unit activates a second power element of said power converting unit to release said energy of said transient voltage surge absorbed by said first capacitor.

\* \* \* \* \*